United States Patent [19]
Gluskoter et al.

[11] Patent Number: 5,735,618
[45] Date of Patent: Apr. 7, 1998

[54] METHOD AND APPARATUS FOR ADJUSTING HEIGHT OF KEYBOARD

[75] Inventors: Steve Gluskoter; Andrew Moore, both of Austin, Tex.

[73] Assignee: Dell U.S.A., L.P., Austin, Tex.

[21] Appl. No.: 785,582

[22] Filed: Jan. 21, 1997

[51] Int. Cl.⁶ .............................. B41J 29/06; F16M 11/24
[52] U.S. Cl. .................... 400/472; 400/682; 361/680; 248/188.4
[58] Field of Search ..................... 400/472, 488, 400/492, 682; 248/188.4, 688; 235/145 R; 341/22; 361/680; 345/168

[56] References Cited

U.S. PATENT DOCUMENTS

| | | | |
|---|---|---|---|
| 3,761,016 | 9/1973 | Pedersen | 235/145 R |
| 4,324,976 | 4/1982 | Lapeyre | 400/472 |
| 4,402,624 | 9/1983 | Stahl et al. | 400/472 |
| 4,527,149 | 7/1985 | Swensen | 400/682 |
| 4,593,874 | 6/1986 | Dunagan | 248/188.4 |
| 4,597,681 | 7/1986 | Hodges | 400/488 |
| 4,991,805 | 2/1991 | Solak et al. | 248/188.4 |
| 5,073,050 | 12/1991 | Andrews | 400/82 |
| 5,102,084 | 4/1992 | Park | 248/286.1 |
| 5,251,102 | 10/1993 | Kimble | 361/683 |
| 5,282,593 | 2/1994 | Fast | 248/188.4 |
| 5,375,800 | 12/1994 | Wilcox et al. | 248/118.1 |
| 5,502,460 | 3/1996 | Bowen | 345/168 |
| 5,539,615 | 7/1996 | Sellers | 361/680 |
| 5,541,593 | 7/1996 | Arsem | 400/472 |
| 5,564,844 | 10/1996 | Patterson, Jr. et al. | 400/679 |

*Primary Examiner*—Edgar S. Burr
*Assistant Examiner*—Leslie Grohusky
*Attorney, Agent, or Firm*—Haynes and Boone, L.L.P.

[57] ABSTRACT

A computing system having a keyboard that is supported from a work surface by one or more support members. The positions of the support members relative to the keyboard are varied in accordance with a predetermined timed sequence, causing corresponding variances in the height of the housing portions corresponding to the support members. The intervals between height variances are such that the latter variances are not noticeable by the user of the system.

15 Claims, 1 Drawing Sheet

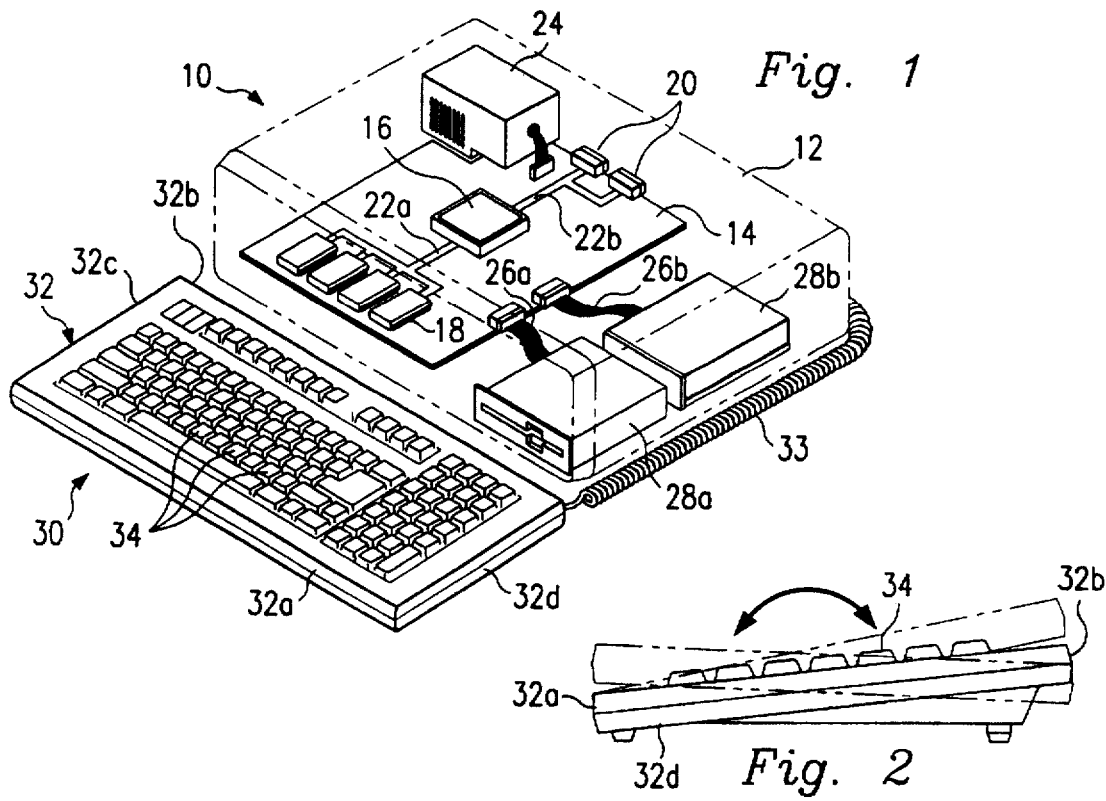
Fig. 1
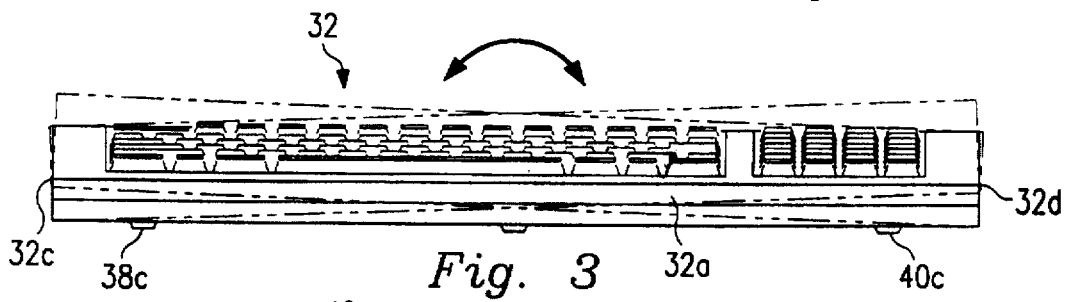
Fig. 2
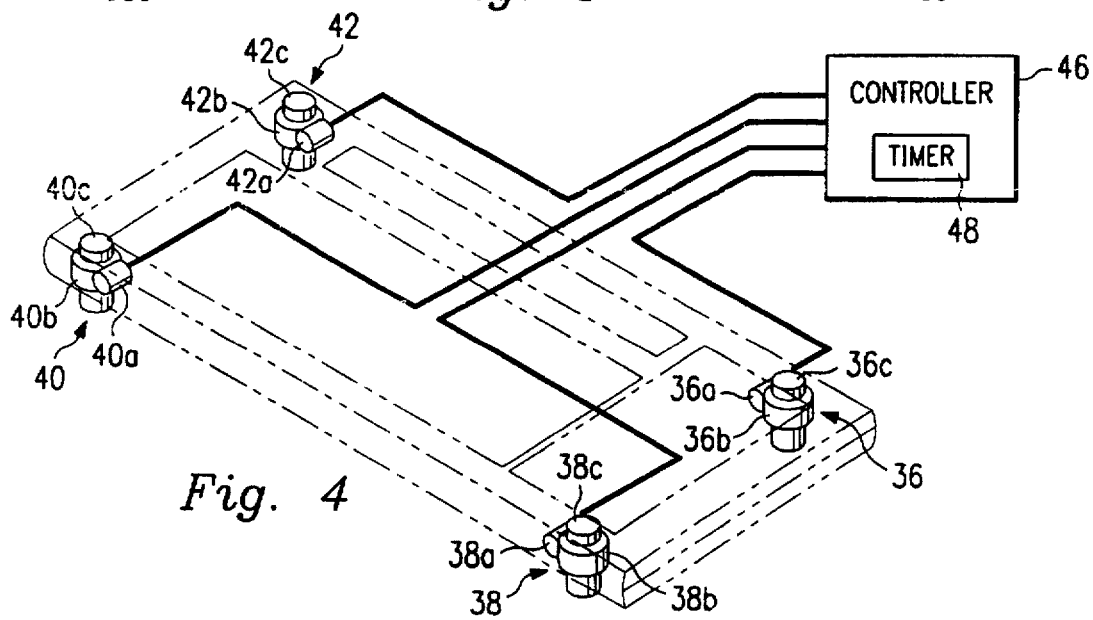
Fig. 3
Fig. 4

METHOD AND APPARATUS FOR ADJUSTING HEIGHT OF KEYBOARD

TECHNICAL FIELD

The invention relates generally to the field of computers, and more particularly to a computing system including a computer and a keyboard that is adjustable to prevent discomfort with extended use.

BACKGROUND

A great majority of computing systems on the market today come with a computer and a separate keyboard which is connected to the computer. It is generally believed that extended use of the keyboard can be uncomfortable due to repetitive motions.

"Ergonomic" keyboards have been introduced to the market that attempt to solve this discomfort, including designs that allow the user to set the keyboard up into a more "neutral" posture, that is, a posture that adapts to various parts of the body, including wrists, forearms and shoulders. These type of designs permit the adjustment of height for wrist, forearm and shoulder extension/flexion, slope for wrist extension/flexion, tenting for wrist pronation/supination, and/or splay for ulnar/radial deviation (wrist).

However, although these keyboard designs allow the user to customize the specific position of the keyboard, the position, once set, still subjects the user to prolonged discomfort.

Therefore what is need is a computer having a keyboard that is adjustable but is not subject to prolonged discomfort.

SUMMARY

Accordingly, an embodiment of the present invention is directed to a computing system having a keyboard and one or more support members connected to a lower portion of the keyboard. The height of each support member is varied in accordance with a predetermined timed sequence to vary the height of the housing portion accordingly without requiring the user to make constant mechanical adjustments to the keyboard. Each of the adjustments would slowly change over a relative long period of time to the extent that they would not be noticed by the user during use.

BRIEF DESCRIPTION OF THE DRAWINGS

FIG. 1 is an isometric view of an embodiment of the computing system according to an embodiment of the present invention.

FIG. 2 and FIG. 3 is a side view and a front view, respectively, of the keyboard of FIG. 1, showing different positions of the keyboard.

FIG. 4 is an isometric view of the bottom of the keyboard of FIGS. 2 and 3, depicting four actuators for tilting the keyboard, along with a schematic representation of a control circuit for the actuators.

DETAILED DESCRIPTION OF THE PREFERRED EMBODIMENT

FIG. 1 of the drawings depict the computing system of the present invention which includes a computer 10 which can be in the form of desktop computer or a tower computer. The computer 10 includes a chassis 12 (shown in phantom lines) in which a motherboard 14 is mounted. A processor 16, a plurality of memory modules 18, and two input/output (I/O) devices 20 are mounted on the motherboard 14. Two buses 22a and 22b are also provided on the motherboard 14 that connect the processor 16 to the memory modules 18 and to the input/output devices 20, respectively. A power supply 24 is connected to the motherboard 16 and a pair of cable assemblies 26a and 26b connect the motherboard 14 to a disk drive unit 28a and a hard drive unit 28b, respectively. It is understood that other components, electrical traces, electrical circuits and related devices (not shown) are provided in the chassis 10. Since these are all conventional, they will not be described in any further detail.

A keyboard 30 is provided and is connected to one of the input/output devices 20 by a cable 33. The keyboard 30 includes a housing 32 having a front end 32a, a rear end 32b, and two sides 32c and 32d. A plurality of keys 34 are provided on the upper surface of the housing 32 for inputting data into the computer 10 where it is received by the one I/O device 20, it being understood that the housing 32 contains proper conventional electrical circuits and components to permit this.

FIGS. 2 and 3 depict the various positions that the housing 32 can take according to an embodiment of the present invention. With reference to FIG. 2, a starting or "normal" position of the housing 32 is shown in solid lines. This position can be set at the factory or by the user in a manner to be described. According to an embodiment of the present invention, the front end 322 can be raised and lowered to and from the normal position, as shown, for example, by the phantom lines. Similarly, the rear end 32b of the housing can be raised and lowered to and from its normal position, as also shown by example by the phantom lines. As shown in FIG. 3, the side ends 32c and 32d can be raised and lowered to and from their normal positions, also shown, for example, by the phantom lines. It is understood that the front end 32a, the rear end 32b, and the sides 32c and 32d can each be lowered and raised independently from each other, and that the positions of the housing shown by the phantom lines are for the purposes of example only and are infinitely variable within a predetermined range, as will be described.

As better shown in FIG. 4, four actuators 36, 38, 40 and 42 are mounted to the bottom of the housing 32 near the four corners thereof in any known manner. The actuators 36–42 are of a conventional design and, as such, include motors 36a–42a, internally threaded screw jacks 36b–42b and externally threaded shafts 36c–42c, respectively. Referring to the actuator 36 for the purposes of example, at least a portion of the threaded shaft 36c is disposed in the screw jack 36b in threaded engagement therewith. The design is such that, upon actuation of the motor 36a, the screw jack 36b rotates, causing corresponding axial movement of the shaft 36c in an upward or downward direction as viewed in FIG. 4, depending on the direction of rotation of the motor 36a and the screw jack 36b. The actuators 38–42 are identical to the actuator 36 and, since the actuators 36–42 are conventional, they will not be described in any further detail.

The actuators 38–42 are mounted relative to the bottom wall, or base, of the keyboard housing 32 in a conventional manner so that the shafts 36c–42c extend perpendicular to the bottom wall and, as such, form support members, or "feet", for the housing 32. When the keyboard 30 is placed on a flat work surface in the general position shown in FIGS. 2 and 3, the shafts 36c–42c support the keyboard 30 in an elevated position from the work surface. Upon actuation of each actuator 36–42, a corresponding corner of the housing 32 can be raised and lowered independently of the others to one of an infinitely variable number of positions between a fully retracted and a fully extended position of the shafts 36c–42c.

Referring to FIG. 4, a controller 46 is electrically connected to the motors 36a–42a of the actuators 36–42 by conventional electrical cabling for continuously varying the retraction and extension of the shafts 36c–42c. A timer 48 is operatively connected to the controller 46 for controlling the operation of the controller 46, and therefore the corresponding retraction or extension of the shafts 36c–42c, in accordance to a predetermined timed sequence. The controller 46 and the timer 48 can be mounted in the chassis 12, in the housing 32, or outboard of both in a separate housing (not shown). It is understood that the controller 46 includes a micro-processor, or the like, that controls actuation of each motor 36a–42a independently of the others and the timer sets a predetermined timed sequence of operation. This causes corresponding continuous retraction or extension of the shafts 36c–42c a number of times over a set period of time and thus varies the height of the keyboard 30 accordingly.

In operation, the controller 46 and the timer 48 are set so that, when the computer 10 and the keyboard 30 are in use, the shafts 36c–42c of the keyboard housing 32 continuously vary the heights of the corresponding corners of the housing across a preset or user programmed range. Preferably, the height variations of the shafts 36c–42c slowly change over a relative long period of time to the extent that they would not be noticed by the user during use.

The embodiment of the present invention described above thus enjoys the advantage of requiring the user to vary his or her posture several times over a predetermined period of time while using the keyboard 30, and thus reduce discomfort without having to make constant mechanical adjustments to the keyboard. This allows normal operation of the keyboard while assuring that the user's hands, wrists, forearms and shoulders will not be in the same position/posture for extended periods of use.

In the event the user does not want the height of the keyboard 30 to continuously vary in accordance with the foregoing, the controller 46 can be turned off when the keyboard is in a preferred position, and the keyboard can thus can be used in a "static" mode.

It is understood that variations may be made in the foregoing without departing from the scope of the invention. For example, the embodiment described above is not limited to use with a desktop computer as described above by means of example, but is equally applicable to any type of self-contained computer, such as laptop computers, notebook computers, and the like. Also, the particular mechanisms for raising and lowering one or more portions of the keyboard can be varied within the scope of the invention. Further, the number of support members, or "feet," formed by the shafts 36c–42c can be varied within the scope of the present invention.

It is also understood that the embodiment of the assembly of the present invention described above is intended to illustrate rather than limit the invention, and that the mounting assembly can take many other forms and embodiments within the scope of the invention.

What is claimed is:

1. A computer system comprising:
   a computer including a processor and a memory;
   a keyboard including a housing and a plurality of keys mounted on the housing for inputting the data to the computer;
   a plurality of height adjustable support members extending from a bottom surface of the housing, each of the support members being adjacent a portion of the keyboard and each support member being independently movable to a plurality of positions relative to the housing for continuously varying the height of each adjacent portion of the keyboard in each position during operation of the keyboard;
   a control unit for varying the position of the support members relative to the housing for varying the height of the housing; and
   a timer associated with the control unit for controlling the operation of the control unit, whereby each portion of the keyboard adjacent each respective support member is height adjusted independent of each other portion of the keyboard to an infinitely variable number of positions between a fully retracted and a fully extended position of each support member.

2. The system of claim 1 wherein the support members threadably extend from the bottom of the housing.

3. The system of claim 2 wherein a support member is positioned in each corner of the bottom of the housing.

4. The system of claim 2, wherein the control unit controls threaded extension of the position of each support member independently of that of the others.

5. The system of claim 1 wherein the support member is a shaft whose height varies to vary the height of the housing accordingly.

6. The system of claim 1 wherein the positions of the support members are gradually varied by the control unit.

7. A keyboard for inputting data to a computer, the keyboard comprising:
   a housing;
   a plurality of keys mounted on the housing for inputting the data to the computer;
   a plurality of height adjustable support members extending from a bottom surface of the housing, each of the support members being adjacent a portion of the keyboard and each support member being independently movable to a plurality of positions relative to the housing for continuously varying the height of each adjacent portion of the keyboard in each position during operation of the keyboard;
   a control unit for varying the position of the support members relative to the housing for varying the height of the housing; and
   a timer associated with the control unit for controlling the operation of the control unit, whereby each portion of the keyboard adjacent each respective support member is height adjusted independent of each other portion of the keyboard to an infinitely variable number of positions between a fully retracted and a fully extended position of each support member.

8. The keyboard of claim 7 wherein the support members threadably extend from the bottom of the housing.

9. The keyboard of claim 8 wherein a support member is positioned in each corner of the bottom of the housing.

10. The keyboard of claim 8, wherein the control unit controls threaded extension of the position of each support member independently of that of the others.

11. The keyboard of claim 7 wherein the support member is a shaft whose height varies to vary the height of the housing accordingly.

12. The keyboard of claim 7 wherein the positions of the support members are gradually varied by the control unit.

13. A method of improving comfort for users of a computer keyboard, comprising the steps of:
   mounting a plurality of height adjustable support members to extend from a bottom surface of a housing for the keyboard, each of the support members being adjacent a portion of the keyboard;

independently moving each support member to a plurality of extended and retracted positions relative to the housing;

controllably varying the extended and retracted positions of the support members relative to the housing for continuously varying the height of the housing during operation of the keyboard; and timing the varying of the positions of the support members so that each portion of the keyboard adjacent each respective support member is height adjusted independent of each other portion of the keyboard to an infinitely variable number of positions between a fully retracted and a fully extended position of each support member.

14. The method of claim 13 wherein the step of independently moving each support member includes the step of independently changing the height of each of a plurality of corners of the keyboard.

15. A method of varying the orientation of a computer keyboard, comprising the steps of:

connecting the keyboard for inputting data to the computer, the keyboard including a housing;

mounting a plurality of height adjustable support members to extend from a bottom surface of the housing, each of the support members being adjacent a portion of the keyboard;

independently moving each support member to a plurality of extended and retracted positions relative to the housing;

controllably varying the extended and retracted positions of the support members relative to the housing for continuously varying the height of the housing during operation of the keyboard; and timing the varying of the positions of the support members so that each portion of the keyboard adjacent each respective support member is height adjusted independent of each other portion of the keyboard to an infinitely variable number of positions between a fully retracted and a fully extended position of each support member.

* * * * *

UNITED STATES PATENT AND TRADEMARK OFFICE
CERTIFICATE OF CORRECTION

PATENT NO. : 5,735,618

DATED : April 7, 1998

INVENTOR(s) : Steve Gluskoter and Andrew Moore

It is certified that error appears in the above-identified patent and that said Letters Patent is hereby corrected as shown below:

Column 2, line 26, "322" should be "32a".

Signed and Sealed this

Sixteenth Day of June, 1998

Attest:

BRUCE LEHMAN

Attesting Officer

Commissioner of Patents and Trademarks